(12) United States Patent  (10) Patent No.: US 9,415,799 B2
Yoshikawa et al.  (45) Date of Patent: Aug. 16, 2016

(54) POWER STEERING DEVICE

(71) Applicant: KAYABA INDUSTRY CO., LTD., Minato-ku, Tokyo (JP)

(72) Inventors: Shinraku Yoshikawa, Gifu (JP); Katsumi Shimoda, Gifu (JP)

(73) Assignee: KYB Corporation, Tokyo (JP)

( * ) Notice: Subject to any disclaimer, the term of this patent is extended or adjusted under 35 U.S.C. 154(b) by 0 days.

(21) Appl. No.: 14/655,334

(22) PCT Filed: Dec. 16, 2013

(86) PCT No.: PCT/JP2013/083680
§ 371 (c)(1),
(2) Date: Jun. 25, 2015

(87) PCT Pub. No.: WO2014/103784
PCT Pub. Date: Jul. 3, 2014

(65) Prior Publication Data
US 2015/0336603 A1  Nov. 26, 2015

(30) Foreign Application Priority Data
Dec. 26, 2012 (JP) .................. 2012-283475

(51) Int. Cl.
*F16H 1/16* (2006.01)
*F16H 35/00* (2006.01)
(Continued)

(52) U.S. Cl.
CPC ............. *B62D 5/0403* (2013.01); *B62D 3/12* (2013.01); *B62D 5/04* (2013.01); *B62D 5/0409* (2013.01);
(Continued)

(58) Field of Classification Search
CPC ....... B62D 5/0403; B62D 5/04; B62D 5/0409

USPC ....................... 180/444; 74/388 PS
See application file for complete search history.

(56) References Cited

U.S. PATENT DOCUMENTS 6,763,738 B1 * 7/2004 Tsutsui ............... B62D 5/0409
74/388 PS
7,493,986 B2 * 2/2009 Kim .................... B62D 5/0409
180/428
(Continued)

FOREIGN PATENT DOCUMENTS

JP   62-92355 U   6/1987
JP   2005-88820 A   4/2005
(Continued)

OTHER PUBLICATIONS

International Search Report and Written Opinion mailed Feb. 18, 2014 for PCT/JP2013/083680.

*Primary Examiner* — Tony Winner
(74) *Attorney, Agent, or Firm* — Hauptman Ham, LLP

(57) ABSTRACT

A power steering device for assisting a steering force applied to a steering wheel by a driver includes a worm shaft that rotates in association with driving of an electric motor, a worm wheel that meshes with the worm shaft and transmits a rotational force of the electric motor to a rack shaft steering a wheel, a bearing that supports a tip end side of the worm shaft, a gear case that houses the worm shaft, a lid that closes an opening formed in a tip end portion of the gear case, a first elastic portion arranged in a compressed manner between the gear case and the lid, and a second elastic portion arranged between an inner circumferential surface of the gear case and an outer circumferential surface of the bearing. The first and the second elastic portion are formed in an integrated manner via a small thickness portion.

6 Claims, 3 Drawing Sheets

(51) Int. Cl.
*F16C 25/08* (2006.01)
*B62D 5/04* (2006.01)
*B62D 3/12* (2006.01)
*F16H 57/12* (2006.01)
*F16H 57/039* (2012.01)
*F16C 27/04* (2006.01)
*F16C 33/76* (2006.01)
*F16C 27/06* (2006.01)
*F16H 57/021* (2012.01)
*F16H 55/24* (2006.01)

(52) U.S. Cl.
CPC .............. *B62D 5/0412* (2013.01); *F16C 27/04* (2013.01); *F16C 27/06* (2013.01); *F16C 33/76* (2013.01); *F16H 1/16* (2013.01); *F16H 57/039* (2013.01); *F16H 57/12* (2013.01); *F16C 2326/24* (2013.01); *F16H 55/24* (2013.01); *F16H 2057/0213* (2013.01); *F16H 2057/127* (2013.01)

(56) References Cited

U.S. PATENT DOCUMENTS

| | | | | |
|---|---|---|---|---|
| 2002/0017420 | A1* | 2/2002 | Kinme | B62D 5/0409 180/444 |
| 2005/0072650 | A1* | 4/2005 | Barror | B65G 53/521 193/27 |
| 2008/0006472 | A1* | 1/2008 | Song | B62D 5/0409 180/444 |
| 2013/0126260 | A1* | 5/2013 | Kim | B62D 5/0409 180/444 |

FOREIGN PATENT DOCUMENTS

| | | |
|---|---|---|
| JP | 2006-175891 A | 7/2006 |
| JP | 2008-39049 A | 2/2008 |
| JP | 2010-53910 A | 3/2010 |
| JP | 2010-116089 A | 5/2010 |
| JP | 2012-197028 A | 10/2012 |

* cited by examiner

POWER STEERING DEVICE

TECHNICAL FIELD

The present invention relates to a power steering device.

BACKGROUND ART

JP 2010-116089A discloses an elastic body 7 that seals between a case 4 and a lid 6 with respect to the outside.

SUMMARY OF INVENTION

The elastic body 7 described in JP 2010-116089A not only has a function of sealing between the case 4 and the lid 6, but also has a function of absorbing the load that acts on a bearing 2a from the wheel side via a worm shaft 2 and a worm wheel 3. In this way, banging noise caused by contact between the bearing 2a and the case 4 is prevented.

With the elastic body 7 described in JP 2010-116089A, there is a possibility that the loads produced upon exertion of the individual functions influence each other, resulting in a failure to effectively exert the individual functions.

The present invention aims to absorb the load that acts on a bearing via a worm shaft and a worm wheel while securing the waterproof property between a gear case and a lid.

According to one aspect of the present invention, a power steering device for assisting a steering force applied to a steering wheel by a driver, the power steering device includes: a worm shaft that rotates in association with driving of an electric motor; a worm wheel that meshes with the worm shaft, the worm wheel being configured to transmit a rotational force of the electric motor to a rack shaft steering a wheel; a bearing that rotatably supports a tip end side of the worm shaft; a gear case that houses the worm shaft; a lid that closes an opening formed in a tip end portion of the gear case; a first elastic portion arranged in a compressed manner between the gear case and the lid; and a second elastic portion arranged between an inner circumferential surface of the gear case and an outer circumferential surface of the bearing. The first elastic portion and the second elastic portion are formed in an integrated manner via a small thickness portion therebetween.

DESCRIPTION OF EMBODIMENTS

The following describes a power steering device 100 according to an embodiment of the present invention with reference to the drawings.

The power steering device 100 is mounted on a vehicle and assists a steering force applied to a steering wheel by a driver.

Figure 1:
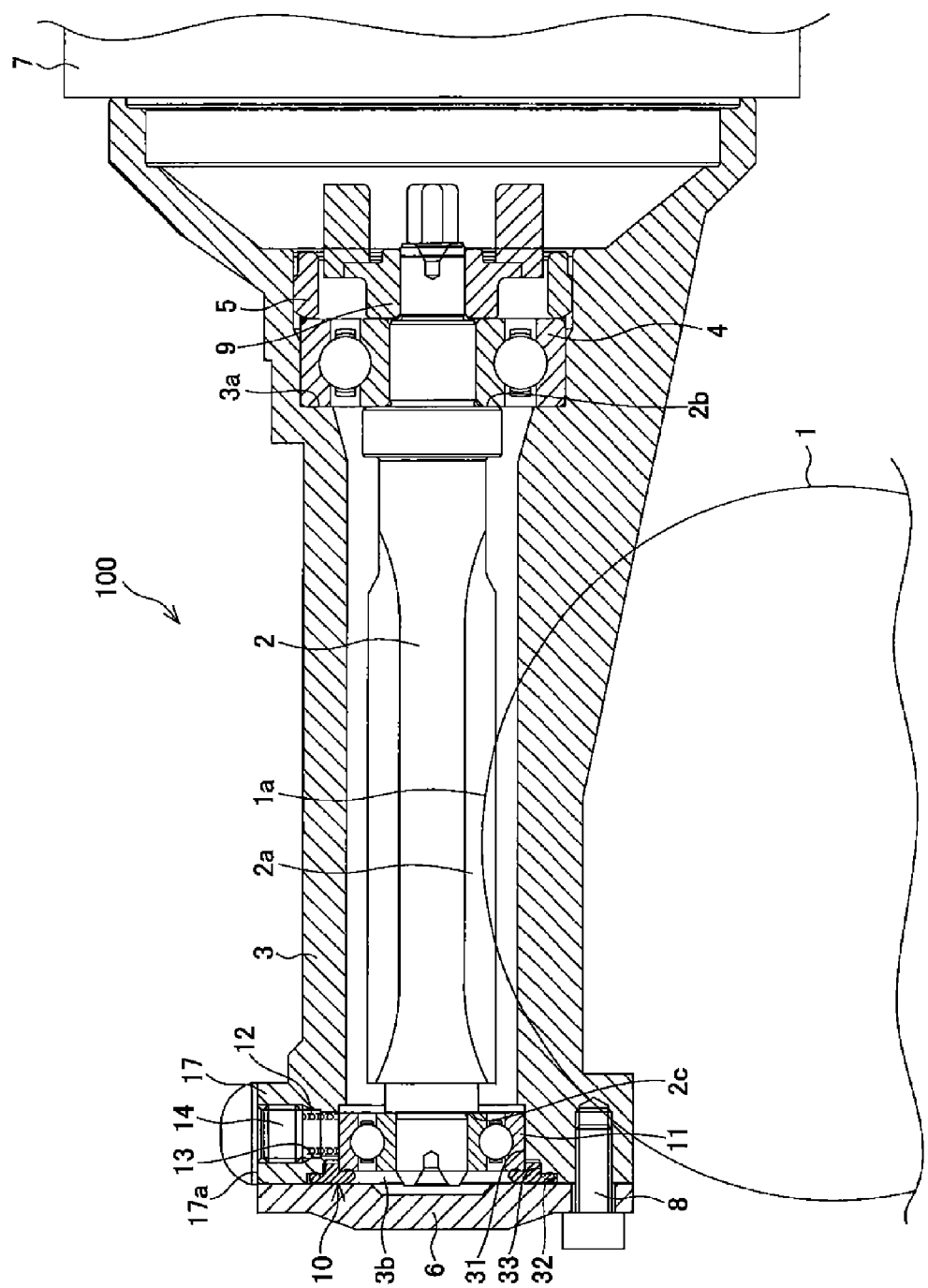
FIG. 1 is a cross-sectional view showing a power steering device according to an embodiment of the present invention.

As shown in FIG. 1, the power steering device 100 includes a worm shaft 2 and a worm wheel 1. The worm shaft 2 is joined to an output shaft of an electric motor 7 and rotates in association with the driving of the electric motor 7. The worm wheel 1 meshes with the worm shaft 2, and is mounted on a steering shaft linked to the steering wheel. The worm wheel 1 transmits a rotational force of the electric motor 7 to a rack shaft that steers a wheel. In association with the driving of the electric motor 7, the worm shaft 2 rotates, and the rotation of the worm shaft 2 is transmitted to the worm wheel 1 at a reduced speed. The worm wheel 1 and the worm shaft 2 together constitute a worm reducer.

The electric motor 7 outputs a torque corresponding to a steering torque calculated on the basis of a torsion amount of a torsion bar that is twisted due to relative rotations of an input shaft and an output shaft. The input shaft and the output shaft constitute the steering shaft. The torque output from the electric motor 7 is transmitted from the worm shaft 2 to the worm wheel 1, and then applied to the steering shaft as an assist torque.

The worm shaft 2 is housed in a metallic gear case 3. A tooth portion 2a that meshes with a tooth portion 1a of the worm wheel 1 is formed on a part of the worm shaft 2. An opening is formed in an inner circumferential surface of the gear case 3 in the position corresponding to the tooth portion 2a. The tooth portion 2a of the worm shaft 2 and the tooth portion 1a of the worm wheel 1 mesh with each other through the opening.

The base end side, that is, the electric motor 7 side of the worm shaft 2 is rotatably supported by a first bearing 4. The first bearing 4 has balls interposed between an annular inner ring and an annular outer ring. The outer ring of the first bearing 4 is held between a step portion 3a formed on the gear case 3 and a locknut 5 fastened to the inside of the gear case 3. The inner ring of the first bearing 4 is held between a step portion 2b of the worm shaft 2 and a joint 9 pressed onto an end portion of the worm shaft 2. In this way, an axial movement of the worm shaft 2 is restricted.

An opening 3b is formed in a tip end portion of the gear case 3. The opening 3b is closed by a lid 6. The lid 6 is fastened to the gear case 3 by a bolt 8 serving as a fastening member. An annular ring 10 serving as an elastic member is interposed between the gear case 3 and the lid 6. The annular ring 10 seals between the gear case 3 and the lid 6.

The tip end side of the worm shaft 2 is rotatably supported by a second bearing 11. The second bearing 11 has balls interposed between an annular inner ring and an annular outer ring. The inner ring of the second bearing 11 is engaged with a step portion 2c formed in the vicinity of a tip end portion of the worm shaft 2.

A projecting flange portion 17 having a flat end surface 17a is formed on an outer circumferential surface of the tip end side of the gear case 3. A through hole 13 is formed in the flange portion 17. An opening of the through hole 13 that opens at the inner circumferential surface of the gear case 3 is formed so as to face an outer circumferential surface 11a of the second bearing 11. A coil spring 12 serving as a biasing member is housed inside the through hole 13. An opening of the through hole 13 that opens at the end surface 17a of the flange portion 17 is closed by a bolt 14.

The coil spring 12 is housed inside the through hole 13 while being compressed between a tip end surface of the bolt 14 and the outer circumferential surface 11a of the second bearing 11, and biases the second bearing 11 in the direction for reducing a gap between the tooth portion 2a of the worm shaft 2 and the tooth portion 1a of the worm wheel 1. That is to say, the coil spring 12 biases the worm shaft 2 towards the worm wheel 1 by applying a biasing force to the outer circumferential surface 11a of the second bearing 11.

The second bearing 11 is housed in a bearing housing hole 31 of the gear case 3. The bearing housing hole 31 is formed so as to allow the second bearing 11 to move towards the worm wheel 1 due to the biasing force of the coil spring 12. Specifically, the bearing housing hole 31 is formed in the shape of an elongated hole.

Figure 3:
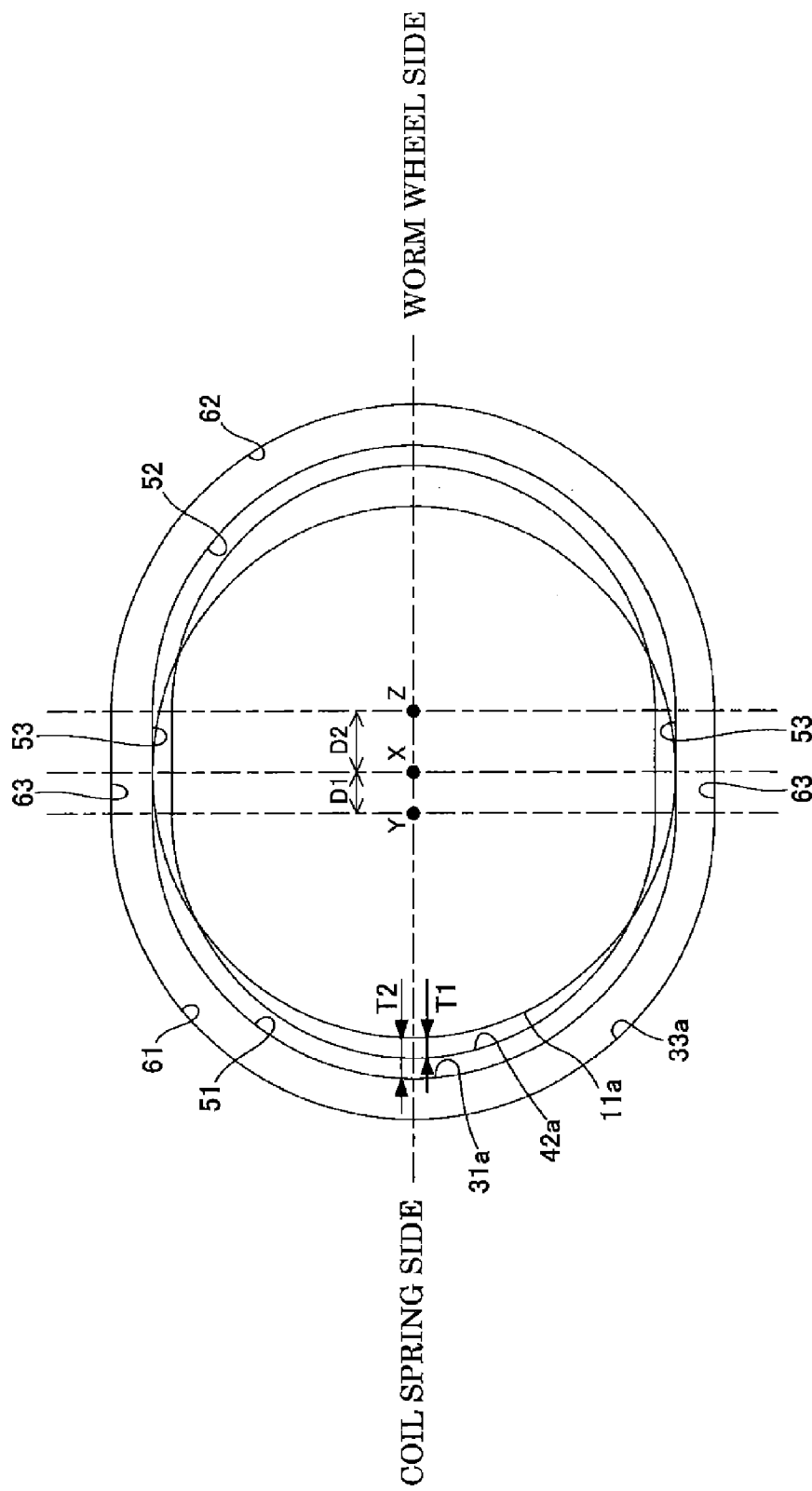
FIG. 3 shows a positional relationship among an inner circumferential surface 31a of a bearing housing hole, an outer circumferential surface 11a of a second bearing, an inner circumferential surface 33a of a second annular groove, and an inner circumferential surface 42a of a second elastic portion.

The elongated hole shape of the bearing housing hole 31 will now be described with reference to FIG. 3. When the second bearing 11 and the first bearing 4 are concentric, the center of the second bearing 11 is a point X. An inner circumferential surface 31a of the bearing housing hole 31 is composed of a first semicircular arc surface 51, a second semicircular arc surface 52, and a pair of flat surfaces 53. The first semicircular arc surface 51 is centered at a point Y that has been offset from the center X towards the coil spring 12 side by a predetermined length D 1. The second semicircular arc surface 52 is centered at a point Z that has been offset from the center X towards the worm wheel 1 side by a predetermined length D2. The pair of flat surfaces 53 is contiguous with the first and second semicircular arc surfaces 51, 52. The first semicircular arc surface 51 and the second semicircular arc surface 52 are symmetric with respect to the pair of flat surfaces 53 therebetween. The pair of flat surfaces 53 is formed in parallel to the biasing direction of the coil spring 12. The length between the pair of flat surfaces 53 is slightly larger than the outer diameter of the second bearing 11. As described above, the bearing housing hole 31 has the shape of an elongated hole, and thus allows the second bearing 11 to move inside the bearing housing hole 31. D2 is set to be longer than D1.

At the time of normal operation of the electric power steering device 100 (hereinafter, simply "at the time of normal operation"), the second bearing 11 is biased towards the worm wheel 1 due to the biasing force of the coil spring 12, and hence there is no backlash between the tooth portion 1a of the worm wheel 1 and the tooth portion 2a of the worm shaft 2. If the abrasion of the tooth portion 1a of the worm wheel 1 and the tooth portion 2a of the worm shaft 2 advances in association with the driving of the power steering device 100, backlash between the worm shaft 2 and the worm wheel 1 is reduced by the movement of the second bearing 11 inside the bearing housing hole 31 caused by the biasing force of the coil spring 12.

In order to allow the second bearing 11 to move inside the bearing housing hole 31, high processing precision is required in processing of the bearing housing hole 31. However, in the case where the bearing housing hole 31 is processed by inserting a tool into the gear case 3 from an opening of the gear case 3 on the electric motor 7 side, it is difficult to achieve the required processing precision. In view of this, the opening 3b is formed in the tip end portion of the gear case 3, and the bearing housing hole 31 is processed by inserting the tool into the gear case 3 from the opening 3b. As described above, the opening 3b is formed in the tip end portion of the gear case 3 in consideration of the processing precision required for the gear case 3. The lid 6 is required to close the opening 3b. Providing the lid 6 for the gear case 3 requires the waterproof property between the gear case 3 and the lid 6. In order to secure this waterproof property, the annular ring 10 is provided.

The annular ring 10 will now be described in detail mainly with reference to FIGS. 2 and 3.

Figure 2:
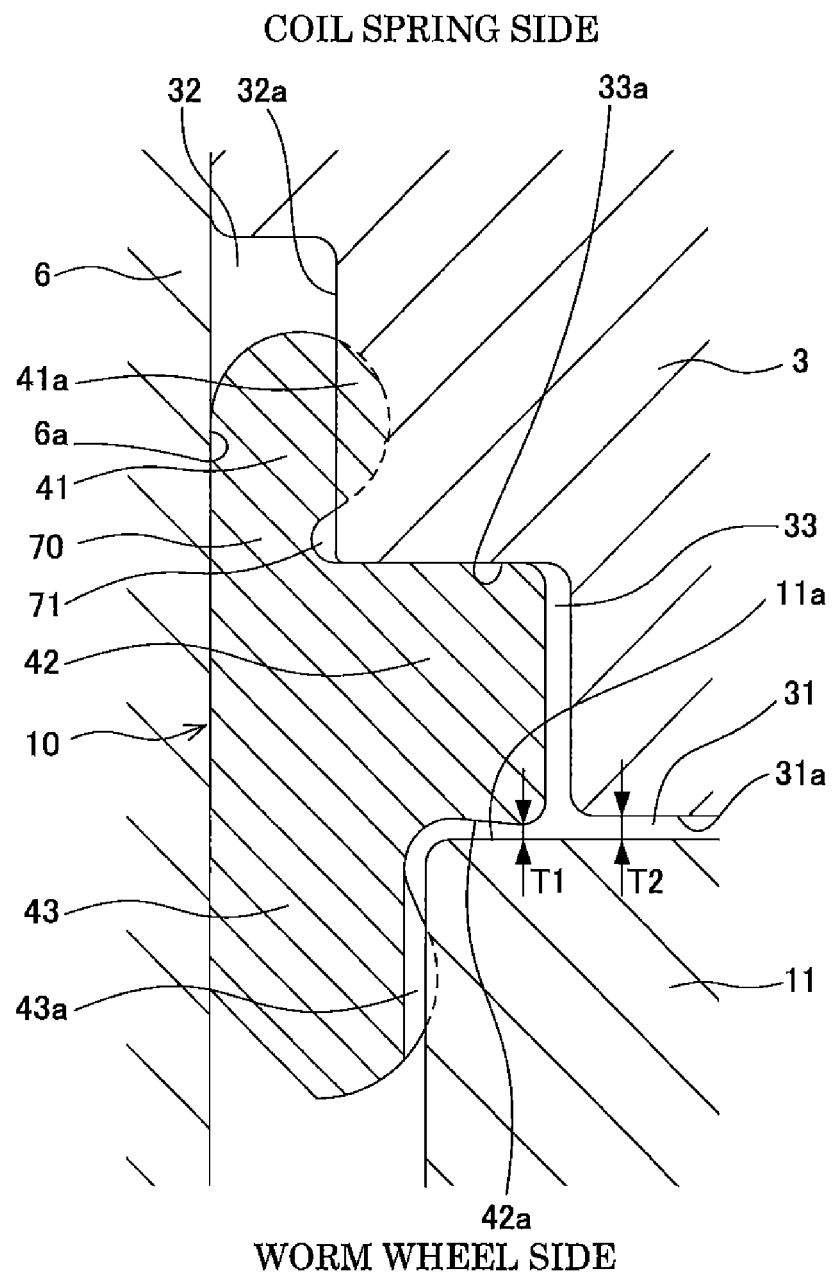
FIG. 2 is an enlarged cross-sectional view of an annular ring.

As shown in FIG. 2, a first annular groove 32, a second annular groove 33, and the bearing housing hole 31 are continuously formed in this order on the inner circumferential surface of the gear case 3 in the vicinity of the opening 3b, with the first annular groove 32 being closest to the opening 3b. The second annular groove 33 has a smaller inner diameter than the first annular groove 32, and has a larger inner diameter than the bearing housing hole 31.

The annular ring 10 is made from natural rubber or rubber-based synthetic resin, and is formed in an annular shape. The annular ring 10 has a first elastic portion 41, a second elastic portion 42, and a third elastic portion 43 in an integrated manner. The first elastic portion 41 is arranged inside the first annular groove 32 in a compressed manner between the gear case 3 and the lid 6. The second elastic portion 42 is arranged inside the second annular groove 33. The third elastic portion 43 is arranged in a compressed manner between the second bearing 11 and the lid 6.

The first elastic portion 41 has a seal portion 41a that is compressed and deformed by coming into contact with a seal surface 32a. The seal surface 32a is a bottom surface of the first annular groove 32. The first elastic portion 41 is arranged in a compressed manner between the gear case 3 and the lid 6 due to the compression and deformation of the seal portion 41a, and has a function of sealing between the gear case 3 and the lid 6.

The seal portion 41a is formed in a circular shape having a curved surface. By forming the seal portion 41a in a circular shape, a compression margin (interference) that is compressed by the seal surface 32a can be made large compared to the case where the seal portion 41a is formed in a linear shape, and therefore the sealing performance of the first elastic portion 41 is improved. In FIG. 2, a portion enclosed by the seal surface 32a and a dash line is the compression margin. The seal portion 41a may be formed so as to be compressed and deformed by coming into contact with a seal surface 6a. The seal surface 6a is an end surface of the lid 6. That is to say, the seal portion 41a is formed so as to be compressed and deformed by coming into contact with at least one of the seal surface 32a of the gear case 3 and the seal surface 6a of the lid 6.

The second elastic portion 42 is arranged between an inner circumferential surface 33a of the second annular groove 33 and the outer circumferential surface 11a of the second bearing 11. At the time of normal operation, in which the second bearing 11 is biased towards the worm wheel 1 by the biasing force of the coil spring 12 and there is no backlash between the tooth portion 1a of the worm wheel 1 and the tooth portion 2a of the worm shaft 2, a gap T1 is present between the outer circumferential surface 11a of the second bearing 11 and an inner circumferential surface 42a of the second elastic portion 42. Therefore, at the time of normal operation, the second elastic portion 42 does not bias the second bearing 11 towards the worm wheel 1, and only the coil spring 12 biases the second bearing 11 in the direction for reducing backlash. This is because, if the second elastic portion 42 is also configured to bias the second bearing 11 towards the worm wheel 1 at the time of normal operation, there is a possibility that the force of friction between the tooth portion 1a of the worm wheel 1 and the tooth portion 2a of the worm shaft 2 becomes excessively large, which increases the operation resistance.

A gap T2 is present between the outer circumferential surface 11a of the second bearing 11 and the inner circumferential surface 31a of the bearing housing hole 31. The gap T1 is radially smaller than the gap T2. That is to say, the inner diameter of the inner circumferential surface 42a of the second elastic portion 42 is smaller than the inner diameter of the inner circumferential surface 31a of the bearing housing hole 31.

When a load exceeding the biasing force of the coil spring 12 is input from the wheel side via the worm shaft 2 and the worm wheel 1, the second bearing 11 forcefully moves against the biasing force of the coil spring 12. In this case, the second bearing 11 moves inside the bearing housing hole 31 and comes into contact with the inner circumferential surface 42a of the second elastic portion 42. Thereafter, the second bearing 11 further moves while compressing the second elastic portion 42, and comes into contact with the inner circumferential surface 31a of the bearing housing hole 31. The second elastic portion 42 acts so as to prevent the second bearing 11 from forcefully hitting the inner circumferential surface 31a of the bearing housing hole 31 by absorbing the load input from the wheel side, thereby reducing the occurrence of banging noise caused by contact between the second bearing 11 and the gear case 3. As such, the second elastic portion 42 has a function of absorbing the load that acts on the second bearing 11 via the worm shaft 2 and the worm wheel 1.

Similarly to the bearing housing hole 31, the second annular groove 33 is formed in the shape of an elongated hole. As shown in FIG. 3, the inner circumferential surface 33a of the second annular groove 33 is composed of a first semicircular arc surface 61, a second semicircular arc surface 62, and a pair of flat surfaces 63. The first semicircular arc surface 61 is centered at the point Y. The second semicircular arc surface 62 is centered at the point Z. The pair of flat surfaces 63 is contiguous with the first and second semicircular arc surfaces 61, 62. The first semicircular arc surface 61 and the second semicircular arc surface 62 are symmetric with respect to the pair of flat surfaces 63 therebetween. The flat surfaces 63 are formed in parallel to the flat surfaces 53, and the length of the flat surfaces 63 is the same as the length of the flat surfaces 53. The radius of curvature of the first and second semicircular arc surfaces 61, 62 is larger than the radius of curvature of the first and second semicircular arc surfaces 51, 52.

As the second annular groove 33 has the shape of an elongated hole, the inner circumferential surface 42a of the second elastic portion 42 housed in the second annular groove 33 also has the shape of an elongated hole. By forming the inner circumferential surface 42a of the second elastic portion 42 in the shape of an elongated hole, the gap T1 between the outer circumferential surface 11a of the second bearing 11 and the inner circumferential surface 42a of the second elastic portion 42 can be made large compared to the case where the inner circumferential surface 42a has the shape of a true circle. This makes it possible to prevent the second elastic portion 42 from biasing the second bearing 11 towards the worm wheel 1 at the time of normal operation with higher reliability.

As shown in FIGS. 1 and 2, the third elastic portion 43 is arranged in a compressed manner between the second bearing 11 and the lid 6, and thrusts the second bearing 11 against the step portion 2c of the worm shaft 2 by axially biasing the second bearing 11. In this way, axial shaking of the second bearing 11 is reduced.

The third elastic portion 43 has a plurality of protrusions 43a that are compressed and deformed by coming into contact with the second bearing 11. This configuration prevents the biasing force applied by the third elastic portion 43 to the second bearing 11 from becoming excessively large, and never inhibits the movement of the second bearing 11 inside the bearing housing hole 31. The protrusions 43a may be formed so as to be compressed and deformed by coming into contact with the lid 6. That is to say, the protrusions 43a are formed so as to be compressed and deformed by coming into contact with at least one of the second bearing 11 and the lid 6.

Here, the first elastic portion 41 has a function of sealing between the gear case 3 and the lid 6, and the second elastic portion 42 has a function of absorbing the load that acts on the second bearing 11 via the worm shaft 2 and the worm wheel 1. Although the first elastic portion 41 and the second elastic portion 42 thus have difference functions, they are formed in an integrated manner. This is because, compared to the case where the first elastic portion 41 and the second elastic portion 42 are formed separately from each other, the number of components can be cut down, and the number of processes of attachment to the gear case 3 can be reduced. Forming the first elastic portion 41 and the second elastic portion 42 in an integrated manner is also effective in preventing an inadvertent failure to attach them to the gear case 3.

However, forming the first elastic portion 41 and the second elastic portion 42 in an integrated manner gives rise to the possibility that they influence each other and cast unfavorable influences on each other's function. To be specific, the first elastic portion 41 is subjected to a compressive load between the gear case 3 and the lid 6. If this compressive load is transmitted to the second elastic portion 42, there is a possibility that the second elastic portion 42 can no longer exert a designed function of absorbing the load that acts on the second bearing 11 via the worm shaft 2 and the worm wheel 1. In this case, the occurrence of banging noise caused by contact between the second bearing 11 and the gear case 3 cannot be reduced. Furthermore, if the load on the second elastic portion 42 is transmitted to the first elastic portion 41 when the second elastic portion 42 absorbs the load that acts on the second bearing 11 via the worm shaft 2 and the worm wheel 1, there is a possibility of decline in the waterproof property between the gear case 3 and the lid 6 due to a change in the compression margin of the seal portion 41a of the first elastic portion 41.

As a countermeasure against the foregoing issues, the first elastic portion 41 and the second elastic portion 42 are formed in an integrated manner with a small thickness portion 70 therebetween, as shown in FIG. 2. The small thickness portion 70 is made by constricting a boundary portion between the first elastic portion 41 and the second elastic portion 42.

The small thickness portion 70 is formed in such a manner that the thickness thereof does not allow compression of the small thickness portion 70 between the gear case 3 and the lid 6. In this way, the first elastic portion 41 and the second elastic portion 42 are independent from each other, and hence prevented from influencing each other.

The small thickness portion 70 is formed continuously with the seal portion 41a of the first elastic portion 41, and has a gap 71 of a predetermined depth. The gap 71 is interposed between the small thickness portion 70 and the seal surface 32a of the first annular groove 32. In this way, the gap 71 acts so as to absorb the compression and deformation of the seal portion 41a. Accordingly, the influences of the first elastic portion 41 and the second elastic portion 42 on each other can be further reduced. In the case where the seal portion 41a is formed so as to be compressed and deformed by coming into contact with the seal surface 6a of the lid 6, the small thickness portion 70 is formed so as to have the gap 71 interposed between itself and the seal surface 6a of the lid 6. That is to say, the small thickness portion 70 is formed so as to have the gap 71 interposed between itself and at least one of the seal surface 32a of the gear case 3 and the seal surface 6a of the lid 6.

The above-described embodiment achieves the following effects.

The first elastic portion 41 is arranged while being subjected to a compressive load between the gear case 3 and the lid 6, and has a function of sealing between the gear case 3 and the lid 6. On the other hand, the second elastic portion 42 has a function of absorbing the load that acts on the second bearing 11 via the worm shaft 2 and the worm wheel 1. The load characteristics of the second elastic portion 42 are important in reducing the occurrence of banging noise caused by contact between the second bearing 11 and the gear case 3. As the first elastic portion 41 and the second elastic portion 42 are formed in an integrated manner via the small thickness portion 70 therebetween, the first elastic portion 41 and the second elastic portion 42 are independent from each other. This prevents transmission of the load from the first elastic portion 41 to the second elastic portion 42 and vice versa, and also prevents the first elastic portion 41 and the second elastic portion 42 from influencing each other. Therefore, the compression margin of the seal portion 41a of the first elastic portion 41 is prevented from changing under the influence of the load on the second elastic portion 42. Also, the load characteristics of the second elastic portion 42 are prevented from changing by being subjected to the load on the first elastic portion 41. Accordingly, the load acting on the second bearing 11 via the worm shaft 2 and the worm wheel 1 can also be absorbed while securing the waterproof property between the gear case 3 and the lid 6.

The following describes modification examples of the above-described embodiment.

(1) The above-described embodiment relates to a configuration in which the coil spring 12 biases the second bearing 11 so as to reduce backlash between the tooth portion 1a of the worm wheel 1 and the tooth portion 2a of the worm shaft 2. This configuration may be replaced with a configuration in which the coil spring 12 is eliminated and the second elastic portion 42 biases the second bearing 11 towards the worm wheel 1 at the time of normal operation. In this case, the second elastic portion 42 has a function of reducing backlash between the tooth portion 1a of the worm wheel 1 and the tooth portion 2a of the worm shaft 2, and a function of absorbing the load that acts on the second bearing 11 via the worm shaft 2 and the worm wheel 1.

(2) The third elastic portion 43 may be formed separately, instead of being formed in an integrated manner together with the first elastic portion 41 and the second elastic portion 42.

(3) In the above-described embodiment, the worm wheel 1 is mounted on the steering shaft linked to the steering wheel. However, instead of adopting this configuration, the worm wheel 1 may be mounted on a pinion shaft that is provided separately from the steering shaft and meshes with the rack shaft.

Embodiments of this invention were described above, but the above embodiments are merely examples of applications of this invention, and the technical scope of this invention is not limited to the specific constitutions of the above embodiments.

This application claims priority based on Japanese Patent Application No.2012-283475 filed with the Japan Patent Office on Dec. 26, 2012, the entire contents of which are incorporated into this specification.

The invention claimed is:

1. A power steering device for assisting a steering force applied to a steering wheel by a driver, the power steering device comprising:
    a worm shaft that rotates in association with driving of an electric motor;
    a worm wheel that meshes with the worm shaft, the worm wheel being configured to transmit a rotational force of the electric motor to a rack shaft steering a wheel;
    a bearing that rotatably supports a tip end side of the worm shaft;
    a gear case that houses the worm shaft;
    a lid that closes an opening formed in a tip end portion of the gear case;
    a first elastic portion arranged in a compressed manner between the gear case and the lid; and
    a second elastic portion arranged between an inner circumferential surface of the gear case and an outer circumferential surface of the bearing, wherein
    the first elastic portion and the second elastic portion are formed in an integrated manner via a small thickness portion therebetween.

2. The power steering device according to claim 1, wherein the small thickness portion is formed in such a manner that a thickness thereof does not allow compression of the small thickness portion between the gear case and the lid.

3. The power steering device according to claim 1, wherein the first elastic portion has a seal portion, the seal portion being compressed and deformed by coming into contact with a seal surface of at least one of the gear case and the lid, and
the small thickness portion is formed continuously with the seal portion, and has a gap between the small thickness portion and the seal surface.

4. The power steering device according to claim 3, wherein the seal portion of the first elastic portion has a circular shape.

5. The power steering device according to claim 1, further comprising
    a third elastic portion formed in an integrated manner together with the first elastic portion and the second elastic portion, the third elastic portion being arranged in a compressed manner between the bearing and the lid.

6. The power steering device according to claim 1, further comprising
    a biasing member that biases the worm shaft towards the worm wheel by applying a biasing force to the bearing.

* * * * *